United States Patent [19]

Bernardi et al.

[11] Patent Number: 4,576,564

[45] Date of Patent: Mar. 18, 1986

[54] DEVICE FOR SPREADING LAYERS OF DOUGH OF CIRCULAR SHAPE FROM DOUGH MASSES OF NEAR SPHERICAL SHAPE

[76] Inventors: Dario Bernardi, Via Mazzini, 5 - Cattolica (Province of Forli); Maurizio Pettinari, Viale Puglia, 14 - Riccione (Province of Forli), both of Italy

[21] Appl. No.: 580,488

[22] Filed: Feb. 15, 1984

[30] Foreign Application Priority Data

Feb. 17, 1983 [IT] Italy .............................. 44010 A/83

[51] Int. Cl.$^4$ ............................................. A21C 3/02
[52] U.S. Cl. .................................. 425/337; 425/340; 425/363
[58] Field of Search ............... 425/218, 335, 337, 340, 425/363

[56] References Cited

U.S. PATENT DOCUMENTS

| | | | |
|---|---|---|---|
| 2,125,859 | 8/1938 | Liebelt | 425/337 |
| 2,687,698 | 8/1954 | Duffy | 425/363 |
| 3,883,283 | 5/1975 | Herrera | 425/337 |
| 3,999,926 | 12/1976 | Victor | 425/337 |
| 4,255,106 | 3/1981 | Anetsberger et al. | 425/337 |
| 4,403,937 | 9/1983 | Zamparelli et al. | 425/337 |

FOREIGN PATENT DOCUMENTS

| | | | |
|---|---|---|---|
| 289367 | 5/1953 | Switzerland | 425/335 |
| 289370 | 7/1953 | Switzerland | 425/335 |

Primary Examiner—Willard E. Hoag
Attorney, Agent, or Firm—Guido Modiano; Albert Josif

[57] ABSTRACT

A device for spreading layers of dough of circular shape from dough balls comprises a first pair of rollers, a second pair of rollers having axes of rotation, arranged at a lower level than the first pair of rollers and at an angle to the first pair, a sloping plane arranged under the first pair and having an upper portion for taking up a dough layer getting out of the first pair, a rotating plane arranged at a lower portion of the sloping plane for receiving the dough layer from the sloping plane. The rotating plane is tiltable around an axis parallel to the axes of rotation of the second pair of rollers from a first position whereat the rotating plane is aligned with the lower portion of the sloping plane to a second position whereat the rotating plane is aligned with an end portion thereof with the second pair of rollers.

1 Claim, 2 Drawing Figures

DEVICE FOR SPREADING LAYERS OF DOUGH OF CIRCULAR SHAPE FROM DOUGH MASSES OF NEAR SPHERICAL SHAPE

BACKGROUND OF THE INVENTION

This invention relates to a device for spreading layers of dough of circular shape from previously prepared dough masses of near spherical shape, particularly for spreading dough for pizzas, pancakes, etc.

These food doughs are usually spread by hand by means of a wood-roller from a previously prepared ball of dough of substantial spheric shape.

In view of an ordinary pizza maker being required to spread hundreds of pizzas each day within a short time period, the operation becomes clearly tiring, in spite of its apparent simplicity.

A machine is available commercially which can spread pizza dough by pressing the dough ball between two heated metal disk plates, but with poor results both as regards the time required by the machine to carry out the operation and the quality of the resulting pizza.

Another prior machine spreads the dough for pizza by passing the dough ball between a first pair of rollers located at a high level, thereafter with the intermediary of a chute, of a hook-like rocker arm device, and small wheel, the dough should be rotated by the hook through 90° to undergo another rolling pass between a second pair of rollers located at a lower level and being angled to the first roller pair, the two roller pairs being fastened to the chute; that is to say, there exists a plane defined by the centerlines of the upper roller pair and lower roller pair which is the theoretical plane along which the dough should slide.

Such a machine provides unsatisfactory results as regards circularity of the final dough pattern because the hook is unable to rotate the dough through 90°, and serious problems are encountered if the weight of the original ball is changed.

There are, moreover, machines whereby the operator, after passing the dough ball between a roller pair is to pick up the rolled dough once again and present it, turned through 90°, to either that same roller pair or another roller pair.

The disadvantages of such machines are apparent.

SUMMARY OF THE INVENTION

Thus, it is a primary object of this invention to provide a device which affords a dough layer of constant circular shape of a given thickness even when the weight of the original doughy mass changes.

A further object of the invention is to provide a device which is both simple and reliable.

These objects are achieved by a device which is characterized in that it comprises two pairs of dough rolling rollers, a first pair placed at a high level and a second pair at a low level, between said roller pairs there being interposed a sloping plane and a rotating plane, thereby the dough after the first rolling pass between the upper roller pair rearranges itself with a 90° rotation such that, after undergoing a second rolling pass, a final pattern of said dough approximates a circular pattern of a desired thickness.

BRIEF DESCRIPTION OF THE DRAWINGS

These and other features of the invention will be clearly understood from the description which follows, given herein by way of example and not of limitation, of a preferred embodiment thereof, with reference to the accompanying drawing, where.

DESCRIPTION OF A PREFERRED EMBODIMENT

Figure 1:
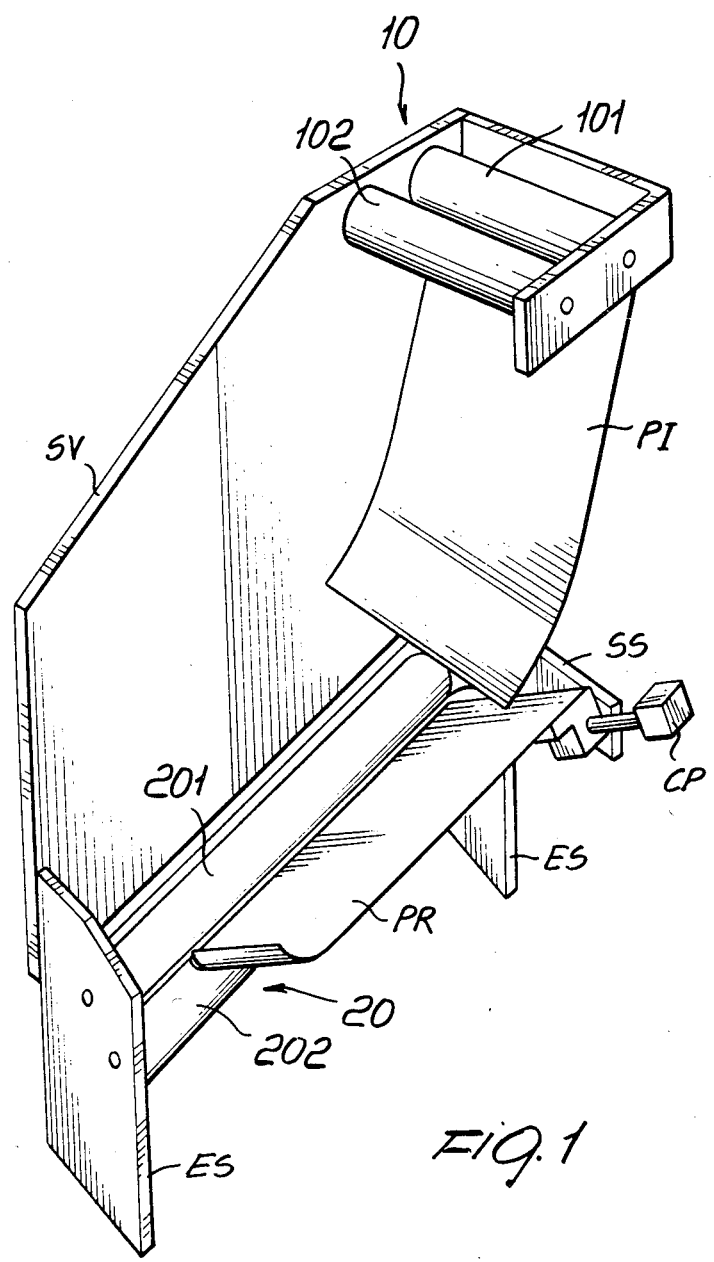
FIG. 1 is a schematic perspective view of the device according to the invention.
Figure 2:
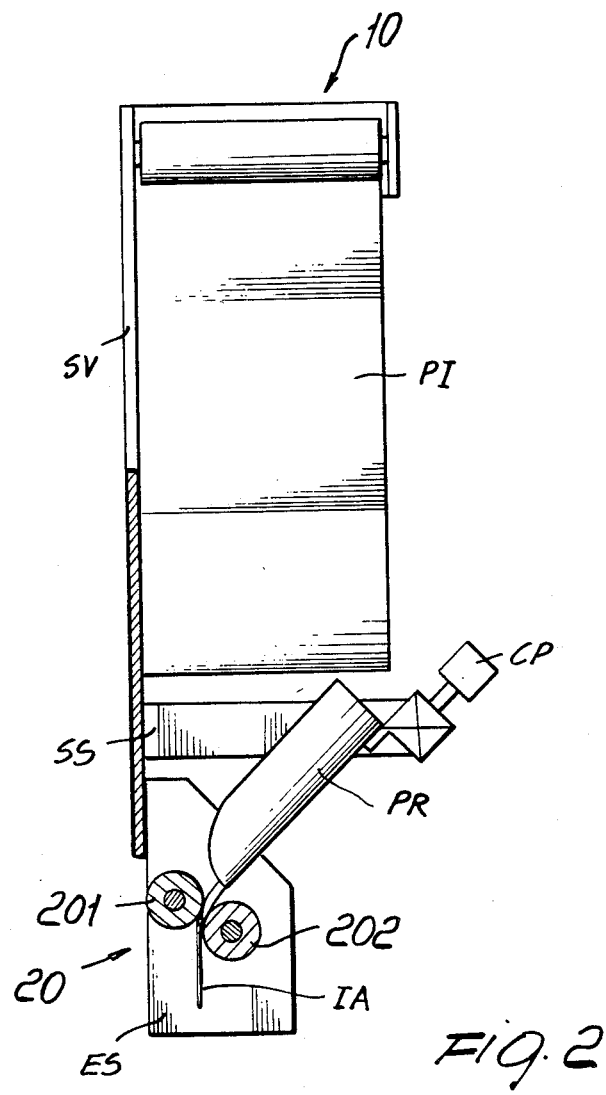
FIG. 2 is a schematic, partly sectional, side view of the inventive device in operation.

Making reference to the drawing views, the device according to the invention comprises essentially two supporting elements ES placed at a low level to support a vertical surface SV to the top whereof are attached two rolling rollers 101 and 102 for unrestricted rotation which are operative interconnected to form the roller pair 10, a sloping plane or tray PI of a suitable shape which is attached to said surface SV and located below said roller pair 10, a supporting element SS attached to said surface SV and located below the sloping tray PI, whereto a rotating tray PR is hinged which is suitably shaped and provided with a counterweight CP, a pair of rollers 20 for rolling the dough and being located below said rotating tray PR and including operatively interconnected rollers 201 and 202 which have their axes parallel to the rotation axis of the rotating tray PR.

Members and a means, not shown in the drawing, are provided to drive the roller pairs 10 and 20, said rollers being turned in operation to pick up and roll the dough, as means of preventing the just rolled dough from adhering on the rollers.

It will be appreciated that after placing an amount of dough IA, having a near spherical original shape, over the first roller pair 10, with the inventive device in operation, the dough IA, after being passed between the first roller pair and assuming an elliptical shape of some thickness, will fall onto the rotating tray PR, causing said tray to tilt under its weight to approximately the centerline of the lower roller pair 20, suitable detents (not shown in the drawing) being provided to only allow a preset rotation of the rotating tray PR. Thereafter said dough IA, in falling between the rollers 201 and 202 undergoes rolling in a perpendicular direction to the former, and emerges from said roller pair 20, and hence from the inventive device, being shaped to a circular pattern with a given thickness dimension.

There are also provided means (not shown in the drawing) operative to set the respective distances between the rollers of the upper pair 10 and rollers of the lower pair 20 for obtaining desired thicknesses of the spread dough; it may be appreciated that the rollers 201 and 202 of the lower pair 20 should have their rolling surfaces set closer together than the rollers 101 and 102 of the upper pair 10.

Of course, the foregoing description is merely illustrative of the invention, details which are obvious to the skilled one having been omitted for simplicity. Furthermore, many changes and modifications, in particular constructional ones, are feasible without departing from the invention scope, as disclosed hereinabove and claimed in the appended claims.

We claim:

1. A device for spreading out amounts of dough of near spherical shape into layers of circular shape comprising one first pair of rolling rollers, one second pair of rolling rollers arranged at a lower level and at right angle with respect to said first pair, a sloping plane having an upper and a lower portion, said upper portion being arranged under said first pair of rollers for taking up a dough layer getting out of said first pair, a rotatable tray arranged below said lower portion and tiltable around a horizontal axis parallel to said second pair of rollers between a first initial position whereat said rotatable tray is aligned with said lower portion of the sloping plane to receive an amount of dough after being passed the first pair of rollers and a second position whereat said rotatable tray is aligned with said second pair of rollers to introduce the amount of dough therebetween, a counterweight being associated to said tray for returning the latter from said second to the initial position.

* * * * *